(12) United States Patent
Wang

(10) Patent No.: US 6,245,875 B1
(45) Date of Patent: Jun. 12, 2001

(54) HIGH DUROMETER LOW STRUCTURING HEAT CURABLE SILICONE ELASTOMER

(75) Inventor: Yi-Feng Wang, Waterford, NY (US)

(73) Assignee: General Electric Company, Pittsfield, MA (US)

(*) Notice: Subject to any disclaimer, the term of this patent is extended or adjusted under 35 U.S.C. 154(b) by 0 days.

(21) Appl. No.: 09/327,866

(22) Filed: Jun. 8, 1999

(51) Int. Cl.⁷ .......................... C08G 77/20; C08G 77/48
(52) U.S. Cl. .......................... 528/25; 524/588; 525/466; 525/477; 528/24
(58) Field of Search .................. 528/24, 25; 525/477, 525/466; 524/588

(56) References Cited

U.S. PATENT DOCUMENTS

| | | |
|---|---|---|
| 3,652,475 | 3/1972 | Wada et al. . |
| 3,660,345 | 5/1972 | Bobear . |
| 3,671,480 | 6/1972 | Wada et al. . |
| 3,696,069 | 10/1972 | Schrage et al. . |
| 4,061,609 | 12/1977 | Bobear . |
| 4,201,698 * | 5/1980 | Itoh et al. . |
| 4,304,820 * | 12/1981 | Deubzer et al. . |
| 4,427,801 | 1/1984 | Sweet . |
| 4,456,654 * | 6/1984 | Kotian . |
| 4,539,357 | 9/1985 | Bobear . |
| 5,122,562 | 6/1992 | Jeram et al. . |
| 5,132,340 * | 7/1992 | Evans ................................ 523/209 |
| 5,610,213 * | 3/1997 | Sumpter ............................ 524/267 |
| 5,674,935 * | 10/1997 | Evans ................................ 524/588 |
| 5,908,897 | 6/1999 | Nakamura et al. . |

* cited by examiner

Primary Examiner—Robert Dawson
Assistant Examiner—Marc S. Zimmer

(57) ABSTRACT

A silicone elastomer composition which has hardness of 80 durometer Shore A, low structuring and low specific gravity.

15 Claims, No Drawings

HIGH DUROMETER LOW STRUCTURING HEAT CURABLE SILICONE ELASTOMER

CROSS-REFERENCE TO RELATED APPLICATIONS

Not applicable

FEDERALLY SPONSORED RESEARCH

Not applicable

1. Field of the Invention

The invention relates to high durometer, low structuring, low specific gravity heat curable silicone elastomers.

2. Brief Description of the Related Art

Silicone heat curable elastomers (HCE) generally consist of diorganopolylsiloxane gum, fluid and silica filler. Silica filler acts as reinforcing component to provide mechanical strength. Current fumed silica filler reinforced high durometer HCE compounds have a structuring problem which is characterized by a significant rise in plasticity over time. The severe structuring problem causes processing difficulties such as feeding these compounds into extruders and injection molding machines, and difficulties in mixing catalysts, pigments and blending with lower durometer compounds because the material will not soften readily on the mill.

SUMMARY OF THE INVENTION

The present invention is directed to a curable composition comprising: (a) 50 to 90 parts by weight of an alkenyl terminated linear diorganopolysiloxane gum having a viscosity in the range of 1,000,000 to 200,000,000 centipoise at 25° C. and having an alkenyl concentration of about 0.01 to 0.05 mole percent of siloxy units; (b) 10 to 30 parts by weight of an alkyl terminated diorganopolysiloxane gum having a viscosity in the range of 1,000,000 to 200,000,000 centipoise at 25° C.; (c) 3 to 20 parts by weight of an alkenyl containing diorganopolysiloxane gum having a viscosity varying from 100,000 to 200,000,000 centipoise at 25° C. and having an alkenyl concentration of about 0.5 to 15 mole percent of siloxy units; (d) 40 to 60 parts by weight of treated fumed silica with surface area varying from about 130 to 350 m$^2$/g; and (e) 0.5 to 3.0 parts by weight of a hydroxy terminated polysiloxane fluid having about 0.5 mole percent alkenyl, and to a silicone elastomer formed by curing the composition. The silicone elastomer composition has a high durometer with low specific gravity. The silicone elastomer composition of the present invention exhibits "low structuring", i.e., it has improved stability with respect to plasticity.

DETAILED DESCRIPTION OF THE INVENTION

In a preferred embodiment, the composition of the present invention comprises, from 50 to 90 parts by weight ("pbw"), even more preferably from 60 to 80 pbw, of the alkenyl terminated diorganopolysiloxane gum; from 10 to 30 pbw, even more preferably from 20 to 30 pbw, of the alkyl terminated diorganopolysiloxane gum; from 3 to 20 pbw, even more preferably from 3 to 10 pbw, of the alkenyl-containing diorganopolysiloxane gum; from 40 to 60 pbw, even more preferably from 50 to 60 pbw, of the treated fumed silica; and from 0.5 to 3.0 pbw, even more preferably from 1.3 to 2.2 pbw of the hydroxy terminated polysiloxane.

Compounds suitable as the alkenyl terminated gum component of the composition of the present invention include, for example, vinyl, propenyl, and butenyl terminated gums. In a preferred embodiment, the alkenyl terminated diorganopolysiloxane gum is vinyl terminated dialkylpolysiloxane gum, more preferably vinyl terminated dimethylpolysiloxane gum, even more preferably vinyl terminated poly (dimethylsiloxane-co-methylvinylsiloxane) gum.

In a preferred embodiment, the alkenyl terminated diorganopolysiloxane is one according to the formula:

where $M^{vi}$ is $R^1 R^2_2 SiO_{1/2}$

D is $R^3_2 SiO_{2/2}$;

$D^{vi}$ is $R^4 R^5 SiO_{2/2}$ where $R^1$ and $R^4$ are $C_2$–$C_6$ alkenyl, preferably vinyl, $R^2$, $R^3$ and $R^5$ are $C_1$–$C_6$ alkyl or $C_2$–$C_6$ alkenyl, preferably methyl, and x and v are chosen so that the viscosity of the gum is in the range of 1,000,000 to 200,000,000 centipoise at 25° C., and having an alkenyl concentration of about 0.01 to 0.05 mole percent of siloxy units.

As used herein, "$C_1$–$C_6$ alkyl" means a straight or branched chain alkyl group containing from 1 to 6 carbon atoms per group, such as, for example, methyl, ethyl, propyl, and butyl.

As used herein, "$C_2$–$C_6$ alkenyl" means a straight or branched chain alkenyl group containing from 2 to 6 carbon atoms per group and at least one double bond between two carbon atoms per group, such as, for example, vinyl, propenyl and butenyl.

Compounds suitable as the alkyl terminated diorganopolysiloxane gum component of the present composition include, for example, methyl, ethyl, propyl, and butyl terminated gums. In a preferred embodiment, the alkyl terminated diorganopolysiloxane gum is a methyl terminated gum, even more preferably trimethyl-terminated polydimethylsiloxane.

In a preferred embodiment, the alkyl terminated diorganopolysiloxane gum is one according to the formula:

where M and D are $R^6 SiO_{3/2}$ and $R^3 SiO_{2/2}$, respectively, where w is chosen so that the viscosity is in the range of 1,000,000 to 200,000,000 centipoise at 25° C.

Compounds suitable as the alkenyl-containing diorganopolysiloxane gum component of the present composition include, for example, vinyl-, propenyl- and butenyl-containing gums. In a preferred embodiment, the alkenyl units are on-chain. As used herein, "on chain" mean that the alkenyl units are on di-organo-functional siloxane units of the gum. In a preferred embodiment, the alkenyl-containing diorganopolysiloxane gum is a vinyl-containing dialkylpolysiloxane, preferably a vinyl-containing dimethylpolysiloxane, even more preferably trimethyl-terminated poly(dimethylsiloxane-co-methylvinylsiloxane).

In a preferred embodiment, the alkenyl-containing diorganopolysiloxane gum is one according to the formula:

where M is $R^6 SiO_{3/2}$, $D^{vi}$ is as previously described, $R^6$ is $C_1$–$C_6$ alkyl or $C_2$–$C_6$ alkenyl, where y and z are chosen so that viscosity ranges from 100,000 to 200,000,000 centipoise at 25° C. and having an alkenyl concentration of about 0.5 to 15 mole percent of siloxy units.

The composition of the present invention may, optionally, further comprise from 0 to 1.0 parts by weight of tetramethyldivinylsilazane. The composition of the present invention may, optionally, further comprise from about 0.5 to 5 parts by weight of trimethylolpropane trimethacrylate.

Optionally, a curing agent is added to cure the rubber composition of the present invention. Any of the conventional curing agents can be used. The preferred curing agents are organic peroxides conventionally used to cure silicone elastomers. Preferred peroxide curing agents include t-butyl-hydroperoxide, cumene hydroperoxide, decaline hydroperoxide, di-t-butyl-peroxide, dicumyl peroxide, α,α-bis(t-butylperoxy)di-isopropylbenzene, t-butyl-cumylperoxide, 2,5-dimethyl-2,5-di-(t-butylperoxyhexyne-3 and 2,5-dimethyl-di (tert-butylperoxy)-hexane. The most preferred of these peroxide curing catalysts is 2,5-dimethyl-di(tert-butylperoxy)-hexane which is available commercially under the trade name VAROX®, available from R. T. Vanderbilt Co, Inc.

Other optional additives used in the compositions of the present invention are coloring agents and pigments.

A highly preferred embodiment of the present invention further comprises: 0 to 1.0 parts by weight of tetramethyldivinylsilazane; and 0.5 to 5 parts by weight of trimethylolpropane trimethacrylate.

The process for forming this composition can be either cold mix or hot mix at temperature above 100° C. The cold mix can be achieved using Banbury or Doughmixer equipment. The hot mix can be achieved using either a Doughmixer batch process or an extruder-type continuous process.

The composition of the present invention is used alone or by first applying it to a substrate, and then curing it to form a cured silicone elastomer. Curing is generally high temperature curing, i.e., at a temperature of about 100° C. or higher.

The silicone elastomer composition of the present invention may be used in a variety of applications, including, for example, forming gaskets, keypads, electronic parts, O-rings and wire and cable coatings.

All United States patents referenced herein are herewith and hereby specifically incorporated by reference.

The examples given below are given for the purpose of illustrating the present invention. All parts are by weight. The following chart describes the components used in the examples:

A—vinyl terminated poly(dimethylsiloxanco-methylvinylsioxane) gum (viscosity 6,000,000 to 150,000,000 cps)
B—trimethyl-terminated polydimethylsiloxane (viscosity 6,000,000–150,000,000 cps)
C—trimethyl-terminated poly(dimethylsiloxane-co-methylvinylsiloxane) (viscosity 100,000 to 1,000,000 cps)
D—hydroxy-terminated poly(dimethylsiloxane-co-methylvinylsiloxane) (viscosity 10 to 20 centistokes)
E—tetramethyldivinylsilazane
F—trimethylolpropane trimethacrylate
Filler—170–230 m²/g treated fumed silicon dioxide
G—vinyl terminated poly(dimethylsiloxane-co-methylvinylsiloxane) gum (viscosity 6,000,000 to 150,000,000 cps)
H—methoxy-terminated poly(dimnethylsiloxane-co-methylvinylsiloxane) (viscosity 5 to 15 centistokes)
I—hydroxy-terminated poly(dimethylsiloxane-co-methylvinylsiloxane) (viscosity 20 to 40 centistokes)
J—vinyl trimethoxy silane
K—vinyl terminated poly(dimethylsiloxane-co-methylvinylsiloxane) gum (viscosity 6,000,000–150,000,000 cps)
L—trimethyl-terminated poly(dimethylsiloxane-co-methylvinylsiloxane) (viscosity 6,000,000–150,000,000 cps) Peroxide Catalyst-2,5-dimethyl-2,5-di-(tert-butylperoxy)hexane.

EXAMPLE 1

In a Farrel Banbury mixer, a heat curable silicone elastomer composition was compounded by combining 1260 g of component (A), 435.6 g of component (B), and 104.4 g of component (C) at a shear rate of 15 r.p.m at 25° C. To this mixture, 27 g of component (D), 1.8 g of component (E) and 36.0 g of component (F) were added. In addition, to this mixture 999 g of treated fumed silica filler was added in three portions. Between each addition of the silica filler, the mixture was mixed with a shear rate of 30 r.p.m at 25 to 70° C. for two minutes. At the end of addition of the silica filler, the compound was mixed further for another 5 minutes with a shear rate of 40 r.p.m at 50 to 70° C.

This compound was catalyzed with 1.2 parts by weight of the peroxide catalyst per 100 parts of the compound. This catalyzed compound was press-cured for 10 minutes at 177° C. and samples were taken to evaluate the mechanical properties. The results are listed in Table 1. The plasticity aging of this compound at room temperature (structuring) was studied over 12 weeks and the data are presented in Table 5.

COMPARATIVE EXAMPLEI1A

In a Farrel Banbury mixer, a heat curable silicone elastomer was compounded by combining 1800 g of component (G), 45 g of component (H), 45 g of component (I) and 14.4 g of component 0) at a shear rate of 15 r.p.m at 25° C. To this mixture, 1134 g of treated fumed silica filler was added in three portions. Between each addition of the silica filler, the mixture was mixed with a shear rate of 30 r.p.m. at 25 to 70C for two minutes. At the end of addition of filler, the compound was mixed further for another 5 minutes with a shear rate of 40 r.p.m at 50 to 70° C.

This compound was catalyzed with 1.2 parts by weight of the peroxide catalyst per 100 parts of the compound. This catalyzed compound was press-cured for 10 minutes at 177° C. and samples were taken to evaluate properties. The results are listed in Table 2. The plasticity aging of this compound at room temperature (structuring) was studied over 12 weeks and the data are presented in Table 5.

EXAMPLES 2 AND 3

In these examples, the compounding process is the same as in Example 1 except that the composition is changed. The composition and physical property results are listed in Tables 3 and 4. The plasticity aging of these compounds at room temperature (structuring) was studied over 12 weeks and the data are presented in Table 5.

TABLE 1

| Component | Example 1 (pbw) |
| --- | --- |
| A | 70 |
| B | 24.2 |
| C | 5.8 |
| E | 0.1 |
| D | 1.5 |

TABLE 1-continued

|  | Example 1 (pbw) |
|---|---|
| F | 2.0 |
| Silica Filler | 55.5 |
| Peroxide Catalyst | 1.2 pts/100 pts compound |
| Properties |  |
| Shore A | 80 |
| Tensile strength, psi | 1262 |
| Elongation (%) | 402 |
| Modulus @ 50%, psi | 453 |
| Modulus @ 100%, psi | 507 |
| Modulus @ 200%, psi | 680 |
| Tear B, ppi | 109 |
| Specific gravity | 1.194 |
| Initial William's Plasticity | 319 |
| William's Plasticity - 21 days | 437 |

Process condition: Banbury cold mix; Mold condition: 350° F., 17 min.
Test methods:
Shore A - ASTM D2240
Tensile strength - ASTM D412
Elongation - ASTM D412
Modulus - ASTM D412
Tear B - ASTM D624
Specific Gravity - ASTM D792
Williams Plasticity - ASTM D926

TABLE 2

|  | Comparative Example 1A (pbw) |
|---|---|
| Component |  |
| G 88488-8 | 100 |
| H 81904 | 2.5 |
| I 88017 | 2.5 |
| J 06174 | 0.8 |
| Silica Filler | 63 |
| Peroxide Catalyst | 1.2 pts/100 pts compound |
| Properties |  |
| Shore A | 75 |
| Tensile strength, psi | 1300 |
| Elongation (%) | 370 |
| Tear B, ppi | 140 |
| Specific gravity | 1.23 |
| Initial William's Plasticity | 376 |
| William's Plasticity - 21 days | 713 |

Process condition: Banbury cold mix; Mold condition: 350° F., 17 min.

TABLE 3

|  | Example 2 (pbw) |
|---|---|
| Component |  |
| K | 70 |
| B | 24 |
| C | 6 |
| E | 0.1 |
| D | 2 |
| F | 1.6 |
| Silica Filler | 57 |
| Peroxide Catalyst | 1.2 pts/100 pts compound |
| Properties |  |
| Shore A | 77 |
| Tensile strength, psi | 1196 |
| Elongation (%) | 440 |
| Modulus @ 50%, psi | 377 |
| Modulus @ 100%, psi | 430 |
| Modulus @ 200%, psi | 582 |
| Tear B, ppi | 109 |
| Specific gravity | 1.198 |
| Initial William's Plasticity | 310 |
| William's Plasticity - 21 days | 459 |

Process condition: Banbury cold mix; Mold condition: 350° F., 17 min.

TABLE 4

|  | Example 3 (pbw) |
|---|---|
| Component |  |
| K | 65 |
| B | 24 |
| L | 11 |
| E | 0.15 |
| D | 2 |
| F | 1.5 |
| Silica Filler | 58 |
| Peroxide Catalyst | 1.2 pts/100 pts compound |
| Properties |  |
| Shore A | 79.2 |
| Tensile strength, psi | 1180 |
| Elongation (%) | 263 |
| Modulus @ 50%, psi | 501 |
| Modulus @ 100%, psi | 697 |
| Modulus @ 200%, psi | 994 |
| Tear B, ppi | 84 |
| Specific gravity | 1.200 |
| Initial William's Plasticity | 327 |
| William's Plasticity - 21 days | 441 |

Process condition: Banbury cold mix; Mold condition: 350° F., 17 min.

TABLE 5

Plasticity aging at 23° C. (Structuring)

| Time (hours) | Comparative Example 1 | Example 1 | Example 2 | Example 3 |
|---|---|---|---|---|
| 0 | 376 | 318 | 310 | 327 |
| 24 | 403 | 380 | 373 | 380 |
| 48 |  | 399 | 395 | 388 |
| 72 | 435 | 421 | 407 | 389 |
| 96 |  | 432 | 416 | 411 |
| 168 | 492 | 435 | 427 | 412 |
| 336 | 535 | 439 | 451 | 423 |
| 504 | 713 | 453 | 459 | 441 |
| 672 | 840 | 456 | 462 | 443 |
| 1008 |  | 460 | 461 | 447 |
| 1344 |  | 460 | 476 | 445 |
| 1560 | 1040 | — | — | — |
| 1680 |  | 465 | 479 | 448 |
| 2016 |  | 465 | 479 | 452 | the percent change in plasticity after 168 and 2016 hours for each of the examples is as follows:

| Time | Comp. Ex. 1 | Example 1 | Example 2 | Example 3 |
|---|---|---|---|---|
| 168 hours | 30.9 | 36.8 | 37.7 | 26.0 |
| 2016 hours | 176.6* | 46.2 | 54.5 | 38.2 |

*After 1560 hours only

The silicone elastomer composition has a high durometer with low specific gravity. The silicone elastomer composition of the present invention exhibits "low structuring", i.e., it has improved stability with respect to plasticity.

What is claimed is:

1. A curable composition compising:
   (a) 50 to 90 parts by weight of an alkenyl terminated linear diorganopolysiloxane gum having a viscosity in the range of 1,000,000 to 200,000,000 centipoise at 25° C. and having an akenyl concentration of about 0.01 to 0.05 mole percent of siloxy units;
   (b) 10 to 30 parts by weight of an alkvl terminated diorganopolysiloxane gum having a viscosity in the range of 1,000,000 to 200,000,000 centipoise at 25° C.;
   (c) 3 to 20 parts by weight of an alkenyl containing diorganopolysiloxane gum having a viscosity varying from 100,000 to 200,000,000 centipoise at 25° C. and having an alkenyl concentration of about 0.5 to 15 mole percent of siloxy units;
   (d) 40 to 60 parts by weight of treated fumed silica with surface area varying from about 130 to 350 $m^2/g$;
   (e) 0.5 to 3.0 parts by weight of a hydroxy terminated polysiloxane fluid having about 0.5 mole percent alkenyl; and
   (f) from about 0.5 to about 5 parts by weight trimethylolpropane trimethacrylate.

2. The composition of claim 1 comprising:
   (a) 50 to 90 parts by weight of an alkenyl terminated linear diorganopolysiloxane gum having the formula:

$$M^{vi}D_xD^{vi}_vM^{vi}$$

where $M^{vi}$ is $R^1R^2_2SiO_{1/2}$
   D is $R^3_2SiO_{2/2}$;
   $D^{vi}$ is $R^4R^5SiO_{2/2}$;
   where $R^1$ and $R^4$ are $C_2$–$C_6$ alkenyl, $R^2$, $R^3$ and $R^5$ are $C_1$–$C_6$ alkyl or $C_2$–$C_6$ alkenyl, and x and v are chosen so that the viscosity of the gum is in the range of 1,000,000 to 200,000,000 centipoise at 25° C., and having an alkenyl concentration of about 0.01 to about 0.05 mole percent of siloxy units;
   (b) 10 to 30 parts by weight of an alkyl terminated diorganopolysiloxane gum having the formula:

$$MD_wM$$

where M and D are $R^6SiO_{3/2}$ and $R^3SiO_{2/2}$, respectively, where w is chosen so that the viscosity is in the range of 1,000,000 to 200,000,000 centipoise at 25° C.;
   (c) 3 to 20 parts by weight of an alkenyl containing diorganopolysiloxane gum having the formula:

$$MD_yD^{vi}_zM$$

where M is $R^6SiO_{3/2}$,
   $D_{vi}$ is $R^4R^5SiO_{3/2}$, $R^6$ is $C_1$–$C_6$ alkyl or $C_2$–$C_6$ alkenyl, where y and z are chosen so that viscosity ranges from 100,000 to 200,000,000 centipoise at 25° C., and having a vinyl concentration of about 0.5 to about 15 mole percent of siloxy units;
   (d) 40 to 60 parts by weight of treated fumed silica with surface area varying from 130 to 350 parts $m^2/g$;
   (e) 0.5 to 3.0 parts by weight of a hydroxy terminated polysiloxane fluid having about 0.5 mole percent vinyl; and
   (f) from about 0.5 to about 5 parts by weight trimethylolpropane trimethacrylate.

3. The composition of claim 1 additionally comprising a curing catalyst.

4. The composition of claim 3, wherein the curing catalyst is a peroxide catalyst.

5. The composition of claim 4, wherein the peroxide catalyst is 2,5-dimethyl-2,5-di-(tert-butylperoxy)hexane.

6. The composition of claim 2, wherein $R^1$ and $R^4$ are vinyl and $R^2$, $R^3$ and $R^5$ each methyl.

7. The composition of claim 1 additionally comprising 0 to 1.0 parts by weight of tetramethyldivinylsilazane.

8. A method for maldng an article, said article comprising a silicone elastomer, comprising: providing a composition comprising:
   (a) 50 to 90 parts by weight of an alkenyl terminated linear diorganopolysiloxane gum having a viscosity in the range of 1,000,000 to 200,000,000 centipoise at 25° C. and having an alkenyl concentration of about 0.01 to 0.05 mole percent of siloxy units;
   (b) 10 to 30 parts by weight of an alkyl terminated diorganopolysiloxane gum having a viscosity in the range of 1,000,000 to 200,000,000 centipoise at 25° C.;
   (c) 3 to 20 parts by weight of an alkenyl containing diorganopolysiloxane gum having a viscosity varying from 100,000 to 200,000,000 centipoise at 25° C. and having an alkenyl concentration of about 0.5 to 15 mole percent of siloxy units;
   (d) 40 to 60 parts by weight of treated fumed silica with surface area varying from about 130 to 350 $m^2/g$;
   (e) 0.5 to 3.0 parts by weight of a hydroxy terminated polysiloxane fluid having about 0.5 mole percent alkenyl; and
   (f) from about 0.5 to about 5 parts by weight trimethylolpropane trimethacrylate, and curing the composition to form an article.

9. The method of claim 8, additionally comprising applying the composition to a substrate before curing the composition.

10. An article made by the method of claim 8.

11. The article of claim 10, wherein the elastomer exhibits a hardness of 80 durometer Shore A and low structuring.

12. The article of claim 10, further exhibiting low specific gravity.

13. An article made by the method of claim 9.

14. The article of claim 13, wherein the elastomer exhibits a hardness of 80 durometer Shore A and low structuring.

15. The article of claim 14, further exhibiting low specific gravity.

* * * * *